US011717104B2

(12) United States Patent
Han et al.

(10) Patent No.: US 11,717,104 B2
(45) Date of Patent: Aug. 8, 2023

(54) SPIRAL BLADE, GRINDING COMPONENT AND FOOD PROCESSOR

(71) Applicants: GUANGDONG MIDEA CONSUMER ELECTRICS MANUFACTURING CO., LTD., Foshan (CN); MIDEA GROUP CO., LTD., Foshan (CN)

(72) Inventors: Han Han, Foshan (CN); Weijie Chen, Foshan (CN); Yan Tang, Foshan (CN)

(*) Notice: Subject to any disclaimer, the term of this patent is extended or adjusted under 35 U.S.C. 154(b) by 1052 days.

(21) Appl. No.: 16/231,972

(22) Filed: Dec. 25, 2018

(65) Prior Publication Data

US 2019/0125117 A1    May 2, 2019

Related U.S. Application Data

(63) Continuation of application No. PCT/CN2017/074752, filed on Feb. 24, 2017.

(30) Foreign Application Priority Data

Jul. 6, 2016  (CN) .......................... 201610533746.8
Jul. 6, 2016  (CN) .......................... 201620714305.3

(51) Int. Cl.
*A47J 19/02* (2006.01)
(52) U.S. Cl.
CPC ........... *A47J 19/023* (2018.08); *A47J 19/025* (2013.01)
(58) Field of Classification Search
CPC ........ A47J 19/023; A47J 19/025; A47J 19/02; A47J 19/06
See application file for complete search history.

(56) References Cited

U.S. PATENT DOCUMENTS 4,393,760 A * 7/1983 Hasegawa ............. A47J 19/025
                                                    100/145
4,429,626 A * 2/1984 Ihara ..................... A47J 19/025
                                                    366/89

(Continued)

FOREIGN PATENT DOCUMENTS

CN       101355897 A    1/2009
CN       102824094 A    12/2012

(Continued)

OTHER PUBLICATIONS

The second Office Action dated Oct. 12, 2019 in the corresponding CN Application No. 201610533746.8.

(Continued)

*Primary Examiner* — Sean M Michalski
(74) *Attorney, Agent, or Firm* — Kilpatrick Townsend & Stockton, LLP

(57) ABSTRACT

The present disclosure provides a spiral blade, a grinding component and a food processor. The spiral blade includes: a spiral blade body, and the spiral blade body includes a feeding area used for feeding, a grinding area connected with the feeding area and a discharging area connected with the grinding area; and a plurality of spiral ribs are arranged on the grinding area, and a cleaning structure is arranged on the discharging area. The spiral blade is applied to the food processor and is only used for grinding food rather than extruding juice and discharging residues, therefore its structure is relatively simple, meanwhile, as a cleaning structure is arranged on the discharging area, the cleaning structure can be used for pushing the crushed food to a predetermined area.

12 Claims, 8 Drawing Sheets

(56) References Cited

U.S. PATENT DOCUMENTS

| | | | | |
|---|---|---|---|---|
| 4,440,074 | A | * | 4/1984 | Ihara ............... A47J 19/025 100/145 |
| 5,156,872 | A | * | 10/1992 | Lee ............... A47J 19/025 426/489 |
| 5,396,836 | A | * | 3/1995 | Kim ............... B30B 11/241 241/101.2 |
| 5,452,650 | A | * | 9/1995 | Lee ............... A47J 19/025 366/291 |
| 5,592,873 | A | | 1/1997 | Lee |
| 5,906,154 | A | * | 5/1999 | Yoon ............... B30B 9/12 100/145 |
| 7,958,820 | B2 | * | 6/2011 | Duperon ............... B30B 9/18 100/145 |
| 8,474,374 | B2 | * | 7/2013 | Trovinger ............... A23N 1/02 99/503 |
| 9,731,467 | B2 | * | 8/2017 | Lin ............... B02C 18/301 |
| 10,045,663 | B2 | * | 8/2018 | Wu ............... A47J 19/025 |
| 10,182,589 | B2 | * | 1/2019 | Lee ............... A23N 1/00 |
| 10,213,044 | B2 | * | 2/2019 | Te Velde ............... A47J 43/04 |
| 10,238,137 | B2 | * | 3/2019 | Mikula ............... A47J 19/06 |
| 10,299,631 | B2 | * | 5/2019 | Kim ............... A47J 43/0716 |
| 2009/0049998 | A1 | * | 2/2009 | Kim ............... B30B 9/128 99/510 |
| 2012/0266762 | A1 | * | 10/2012 | Wang ............... A47J 19/025 99/504 |
| 2016/0037822 | A1 | * | 2/2016 | Thomas ............... A23N 1/02 99/513 |
| 2017/0119214 | A1 | * | 5/2017 | Kim ............... A47J 43/0716 |
| 2017/0273509 | A1 | * | 9/2017 | Wu ............... A47J 19/025 |
| 2018/0184701 | A1 | * | 7/2018 | Liu ............... A23N 1/02 |
| 2019/0126581 | A1 | * | 5/2019 | Han ............... A47J 43/085 |
| 2020/0146495 | A1 | * | 5/2020 | Lien ............... A47J 19/06 |
| 2020/0288897 | A1 | * | 9/2020 | Hu ............... A47J 19/025 |
| 2021/0045566 | A1 | * | 2/2021 | Fields ............... A47J 19/025 |
| 2021/0120995 | A1 | * | 4/2021 | Kim ............... B30B 9/121 |
| 2021/0289971 | A1 | * | 9/2021 | Zhang ............... A47J 19/025 |

FOREIGN PATENT DOCUMENTS

| | | | |
|---|---|---|---|
| CN | 202665186 | U | 1/2013 |
| CN | 202760965 | U | 3/2013 |
| CN | 203122036 | U | 8/2013 |
| CN | 104083066 | A | 10/2014 |
| CN | 203873525 | U | 10/2014 |
| CN | 203873619 | U | 10/2014 |
| CN | 203892468 | U | 10/2014 |
| CN | 104305851 | A | 1/2015 |
| CN | 104433759 | A | 3/2015 |
| CN | 204520244 | U | 8/2015 |
| CN | 204617858 | U | 9/2015 |
| CN | 204764939 | U | 11/2015 |
| CN | 204797529 | U | 11/2015 |
| CN | 204889739 | U | 12/2015 |
| CN | 204985548 | U | 1/2016 |
| CN | 105361624 | A | 3/2016 |
| CN | 205107255 | U | 3/2016 |
| CN | 105589473 | A | 5/2016 |
| FR | 2839255 | A1 | 11/2003 |
| FR | 2839255 | B1 | 2/2006 |
| JP | 2000166779 | A | 6/2000 |
| KR | 1020120012039 | A | 2/2012 |
| KR | 1020120111446 | A | 10/2012 |
| KR | 101440235 | B1 | 9/2014 |
| KR | 101485401 | B1 | 1/2015 |
| WO | 2015034207 | A1 | 3/2015 |
| WO | 2016085153 | A1 | 6/2016 |

OTHER PUBLICATIONS

The second Search Report for CN Application No. 201610533746.8.
The first Office Action of KR application No. 10-2018-7026806.
Supplementary European Search Report dated Mar. 18, 2019 in the corresponding EP application (U.S. Appl. No. 17/823,421).
The first Office Action in the corresponding JP application No. 2019-502128.
International Search Report dated May 27, 2017 in the corresponding PCT application (application No. PCT/CN2017/074752).
Notification of Reexaminationi dated Jun. 20, 2022 of Chinese Application No. 201610533746.8.

* cited by examiner

SPIRAL BLADE, GRINDING COMPONENT AND FOOD PROCESSOR

CROSS-REFERENCES TO RELATED APPLICATIONS

The present application claims the priority of Chinese Application No. 2016105337468, filed in the Chinese Patent Office on Jul. 6, 2016, and entitled "SPIRAL BLADE, GRINDING COMPONENT AND FOOD PROCESSOR", and claims the priority of Chinese Application No. 2016207143053, filed in the Chinese Patent Office on Jul. 6, 2016, and entitled "SPIRAL BLADE, GRINDING COMPONENT AND FOOD PROCESSOR", the entire contents of which are herein incorporated by reference.

FIELD OF THE DISCLOSURE

The present disclosure relates to the field of kitchen utensils, and more specifically relates to a spiral blade, grinding component and a food processor.

BACKGROUND OF THE DISCLOSURE

Juice machines available on the market are divided into vertical juice machines and horizontal juice machines, the vertical juice machines perform extrusion through spiral blades and filter screens and clean the outer rings of the filter screens through rotary brushes during juicing, therefore the parts are numerous and the installation is complicated, meanwhile the holes of the filter screens are too small to be cleaned conveniently, therefore the consumer experience is very poor, the squeezing of the horizontal juice machines is not so sufficient, and thus the juice yield is relatively low.

Therefore, how to propose a juice machine having high juice yield, fewer parts and a simple structure and a spiral blade applied to the juice machine has become an urgent problem to be solved at present.

BRIEF SUMMARY OF THE DISCLOSURE

Disclosure

One embodiment provides a spiral blade. Another embodiment of the present disclosure is to provide a grinding component. And yet another embodiment of the present disclosure is to provide a food processor.

In view of this, one embodiment the present disclosure provides a spiral blade, including: a spiral blade body which includes a feeding area used for feeding, a grinding area connected with the feeding area and a discharging area connected with the grinding area; and a plurality of spiral ribs are arranged on the grinding area, and a cleaning structure is arranged on the discharging area.

According to the spiral blade provided by the embodiment of the present disclosure, the spiral blade includes the feeding area matched with a feed opening of the food processor, that is, the to-be-crushed food arrives at the feeding area of the spiral blade from the feed opening, then is crushed in the grinding area of the spiral blade, finally the crushed food is discharged from the discharging area, meanwhile the spiral blade is applied to the food processor and is only used for grinding the food rather than extruding juice and discharging residues, therefore its structure is relatively simple, meanwhile as a cleaning structure is arranged on the discharging area, the cleaning structure can be used for pushing the crushed food to a predetermined area, so that the crushed food can be pushed away from the predetermined area more easily, and thus the discharging efficiency of the spiral blade can be improved.

Disclosure

In one embodiment, the area of the cross section of the spiral blade body gradually increases from the feeding area to the grinding area.

In one embodiment, the area of the cross section of the spiral blade body gradually increases from the feeding area to the grinding area, that is to say, the spiral blade body is approximately conical, and the taper of the cone is within the range of 3° to 15° and is further 5°, due to this setting, when the spiral blade is applied to the food processor to crush the food, the spiral blade can crush the food smaller and smaller, and thus the food grinding effect of the food processor can be improved to improve the juice yield.

In one embodiment, a plurality of cleaning structures are arranged, this setting can push the food crushed by the spiral blade to the predetermined area by the plurality of cleaning structures, and thus the crushed food can be discharged from the predetermined area.

In one embodiment, the plurality of cleaning structures are symmetrically arranged on the discharging area, as the plurality of cleaning structures are symmetrically arranged, the crushed food on the surrounding of the spiral blade can be pushed to the predetermined area so as to prevent a discharging dead corner.

In one embodiment, the cleaning structure is a cleaning rib and/or the cleaning structure is a slope structure protruding from the spiral blade body.

In one embodiment, the cleaning structure can be a cleaning rib, can also be the slope structure protruding from the spiral blade body, and of course, it can also be other structures that can push the food in the discharging area to the predetermined area.

In one embodiment, the spiral rib extends from a connection site of the grinding area and the discharging area toward the grinding area, and one end of the spiral rib away from the discharging area is in the shape of a sharp spout.

In one embodiment, as one end of the spiral rib away from the discharging area is in the shape of the sharp spout, the food can be better crushed, and thus the juice yield can be improved.

In one embodiment, the spiral blade is made of food-grade wear resistant plastic, of course, can also be made of a metal material, such as stainless steel, copper and the like, and can also be made of ceramic, C segment embedded stainless steel, and, the spiral blade is formed by integrated injection molding.

In one embodiment, the height ratio of the feeding area to the grinding area is A, the value of the height ratio A is: $0.5 \leq A \leq 0.75$, the height ratio of the grinding area to the discharging area is B, and the value of the height ratio B is: $1/3 \leq B \leq 1/15$.

In one embodiment, the height ratios of the feeding area to the grinding area and the discharging area are reasonably set, so that the feeding, grinding and discharging processes of the spiral blade can be reasonably matched with one another, that is, the food can be reasonably and uniformly distributed on three segments of the spiral blade, accordingly, the food can be prevented from pushing and extruding the feeding area, and the food residues can also be prevented from being blocked in the discharging area, as a result, the feeding, grinding and discharging processes can be implemented smoothly, then food blockage and other faults when the spiral blade crushes the food can be avoided, and thus the user experience can be improved.

In one embodiment, the projection height of the spiral rib on the radial direction of the spiral blade body is h, and the value of the projection height h is: 0.5 mm≤h≤29.99 mm.

In one embodiment, as the projection height of the spiral rib on the radial direction of the spiral blade body is set to be within the range of being greater than or equal to 0.5 mm and being smaller than or equal to 29.99 mm, on the one hand, the spiral rib has a certain height, therefore the spiral rib and the spiral blade body can be enclosed to form a passage with a certain volume, the crushed food enters the passage from the feeding area and gradually moves toward the discharging area along the passage, then grinding and discharging can be accomplished, meanwhile, as the projection height of the spiral rib on the radial direction of the spiral blade body is set to be within the range of being greater than or equal to 0.5 mm and being smaller than or equal to 29.99 mm, the height of the spiral rib is not too large, accordingly the overall strength of the spiral rib can be guaranteed, therefore the grinding degree of the spiral blade on the food can be properly improved to improve the grinding effect of the food, meanwhile, after the strength of the spiral rib is improved, the overall strength of the spiral blade can also be improved, and the service life of the spiral blade is prolonged.

In one embodiment, the width of one end of the spiral rib connected with the spiral blade body is t1, and the value of the width t1 is 5 mm≤t1≤21.99 mm.

In one embodiment, as the width of one end (i.e., the root of the spiral rib) of the spiral rib connected with the spiral blade body is set to be within the range of being greater than or equal to 5 mm and being smaller than or equal to 21.99 mm, the spiral rib and the spiral blade body have a certain connecting width, therefore the connecting strength between the spiral rib and the spiral blade body can be improved, as a result, the situation that the spiral rib of the spiral blade breaks in a juice extrusion and residue discharge process can be prevented, then the overall strength of the spiral blade can be improved, and the service life of the spiral blade is prolonged.

In one embodiment, the width of one end of the spiral rib away from the spiral blade body is t2, and the value of the width t2 is 1 mm≤t2≤4.99 mm.

In one embodiment, as the width of one end (i.e., the end part of the spiral rib) of the spiral rib away from the spiral blade body is set to be within the range of being greater than or equal to 1 mm and being smaller than or equal to 4.99 mm, the width of the end part of the spiral rib is smaller, therefore the crushed food can be guided to move from a feeding segment toward an extrusion segment and a residue discharge segment in sequence along the spiral blade, and thus the juice extrusion and residue discharge efficiency of the spiral blade can be improved.

In one embodiment, the spiral blade further includes: a mounting shaft, and the spiral blade body is installed on the mounting shaft, and the mounting shaft is used for mounting the spiral blade body.

In one embodiment, when the spiral blade is installed, the mounting shaft can be in driving connection with a motor and other driving devices, so as to realize driving installation of the spiral blade.

The embodiment of the present disclosure provides a grinding component for a food processor, the grinding component includes a first barrel body; and the spiral blade provided by any embodiment of the first aspect, which is rotationally installed in the first barrel body, and is matched with the first barrel body to crush the food.

The grinding component provided by the embodiment of the present disclosure can be applied to the food processor including an extrusion component, therefore the food can be crushed by using the grinding component, the crushed food enters the extrusion component, the extrusion component accomplishes a juice extrusion and residue discharge process, that is, the grinding process and the juice extrusion and residue discharge process of the food are separately performed, the grinding component mainly crushes the food by using the spiral blade provided by any embodiment of the present disclosure, and thus the grinding component provided by the embodiment of the present disclosure has all the beneficial effects of the spiral blade provided by any one of the above-mentioned embodiments.

In one embodiment, a first gap is arranged between the spiral blade and an inner side wall of the first barrel body; and the first gap gradually decreases from the feeding area to the discharging area.

In one embodiment, when the spiral blade is matched with the inner side wall of the first barrel body to crush the food, the spiral blade and the inner side wall of the first barrel body form a grinding passage, the first gap gradually decreases from the feeding area to the discharging area, that is to say, the grinding passage formed by the spiral blade and the inner side wall of the first barrel body becomes narrower and narrower, then when the food is crushed by using the grinding passage, the food can be crushed smaller and smaller, for example, when the food just enters the first barrel body, the granules of the food are greater, the distance between the inner side wall of the first barrel body and the grinding device adapts to the granules of the food, the food is gradually crushed to smaller granules and gradually moves toward the bottom of the first barrel body under the action of the grinding device and the first barrel body, so the first gap close to the bottom of the first barrel body is set to be smaller, in this case, the first gap can adapt to the sizes of the granules of the food herein on the one hand, the food herein can be further crushed to smaller granules under the coaction of the grinding device and the first barrel body on the other hand, accordingly gradual and sufficient grinding of the food can be realized, and then the juice yield of the food can be improved.

In one embodiment, the first gap is within the range of 0.3 mm to 18.99 mm, further, the gap between the feeding area and the inner side wall of the first barrel body is 3-18.99 mm, and the gap between the residue discharge area and the inner side wall of the first barrel body is 0.3-2.99 mm.

In one embodiment, the barrel opening of the first barrel body gradually decreases from one end close to the feeding area to the other end close to the discharging area.

In one embodiment, the barrel opening of the first barrel body gradually decreases from one end close to the feeding area to the other end close to the discharging area, that is, the inner cavity of the first barrel body is in the shape of an inverted cone having a large upper part and a small lower part, so the first gap between the first barrel body and the spiral blade can gradually decrease from top to bottom, then the food can be crushed smaller and smaller, and thus the juice yield of the food can be improved.

The embodiment of the present disclosure provides a food processor, including: a feed opening; the grinding component in any embodiment, and the first barrel body of the grinding component is communicated with the feed opening; an extrusion component which includes a second barrel body and an extrusion device rotationally installed in the second barrel body, and the second barrel body is communicated with the first barrel body through a communication opening, and the extrusion device is matched with the inner side wall of the second barrel body for extruding juice and discharging residues; and a host component on which the grinding component and the extrusion component are installed and which includes a driving component, and the driving component is used for driving the spiral blade of the grinding component to crush the food and is used for driving the extrusion device to extrude juice and discharge residues.

According to the food processor provided by the embodiment of the present disclosure, after the food enters the first barrel body from the feed opening, the food is crushed by the match of the spiral blade and the side wall of the first barrel body, and the crushed food enters the second barrel body from the communication opening under the action of the spiral blade and is extruded by the extrusion device to separate the juice of the food from the residues. In one embodiment, the grinding process and the juice extrusion and residue discharge process of the food are separately performed, no juice extrusion or residue discharge is required in the grinding process, therefore no filter screen or a rotary brush and other components need to be arranged in the first barrel body, so that the food in the first barrel body can be crushed under the coaction of the first barrel body and the spiral blade, meanwhile, the extrusion device can be approximately horizontally arranged in the juice extrusion and residue discharge process, that is, a juice extrusion and residue discharge system can be set to be horizontal, accordingly the juice and residues of the food can be conveniently separated, this setting can ensure the juice yield of the food processor on the one hand, and can avoid the use of the filter screen, the rotary brush and other parts and components on the other hand, in this case, the food processor is simple in structure and is easy to install, meanwhile, as the filter screen is cancelled, the cleaning difficulty of the user can be reduced, and then the user experience can be improved.

In one embodiment, a juice discharge opening and a residue discharge opening are formed in the second barrel body; and a filter sheet is arranged at the juice discharge opening.

In one embodiment, after the crushed food enters the second barrel body, the juice is separated from the residues under the extrusion of the extrusion device, the separated food juice is discharged from the juice discharge opening on the second barrel body, and the separated food residues are discharged from the residue discharge opening on the second barrel body. The filter sheet is arranged to prevent the food residues from being discharged from the juice discharge opening, meanwhile the distance between the filter sheet and the extrusion device can also be reasonably set according to the sizes of the granules of the food residues, so that the automatic cleaning of the filter sheet can be realized by the friction between the extrusion device and the filter sheet, and, the extrusion device is in contact with the filter sheet, or the gap between the extrusion device and the filter sheet is smaller than the sizes of the granules of the food.

In one embodiment, the filter sheet is a metal filter sheet, as the hardness and the wear resistance of the metal filter sheet are relatively good, so when the filter sheet is cleaned by the extrusion device, the situation that the filter sheet is damaged due to insufficient strength can be prevented.

In one embodiment, an extrusion sheet is arranged at the residue discharge opening.

In one embodiment, the extrusion sheet is arranged at the residue discharge opening to further extrude the food, so that the juice-residue separation of the food is more thorough, then more food juice can be extruded, and thus the juice yield of the food processor can be improved. the extrusion sheet is an extrusion rubber sheet, and as the extrusion rubber sheet has a certain elasticity, the food residues can be further extruded.

In one embodiment, the extrusion device is an extrusion screw.

In one embodiment, the second barrel body includes: a hollow barrel seat with one open end, and the other end of the barrel seat is communicated with the first barrel body through the communication opening; and a barrel lid covered on the open end of the barrel seat, and the residue discharge opening is formed in the barrel lid.

In one embodiment, the barrel seat can be installed on the first barrel body at first, then the extrusion device is installed on the driving component in a driving manner, and the barrel lid is covered on the barrel seat to accomplish the installation of the second barrel body.

In one embodiment, the first barrel body and the barrel seat are of an integral structure, this setting can enhance the connecting strength between the first barrel body and the barrel seat on the one hand, and can guarantee the sealing property between the first barrel body and the barrel seat on the other hand, so that the situation of juice leakage can be prevented.

In one embodiment, the first barrel body and/or the second barrel body are/is made of a transparent material or a stainless steel material.

In one embodiment, since the first barrel body and the second barrel body are made of the transparent material, the user can clearly see the food in the first barrel body and the second barrel body, as a result, the user can master the condition of the food in the first barrel body and the second barrel body, and thus the user experience can be improved. If the first barrel body and the second barrel body are made of the stainless steel material, the strength of the first barrel body and the second barrel body can be ensured on the one hand, and rusting and other conditions of the first barrel body and the second barrel body can be prevented on the other hand, therefore the durability of the first barrel body and the second barrel body can be improved.

In one embodiment, the driving component includes a motor on which a motor shaft is arranged; a transmission component which the transmission component at least includes: a first transmission part which is in driving connection with the motor shaft, and a first driving shaft is arranged on the first transmission part, and the first driving shaft is connected with the spiral blade and is used for driving the spiral blade to crush the food; and a second transmission part which is in driving connection with the motor shaft, and a second driving shaft is arranged on the second transmission part, and the second driving shaft is connected with the extrusion device and is used for driving the extrusion device to extrude juice and discharge residues; and the first driving shaft is vertically arranged, the first driving shaft forms a preset angle $\beta$ with the second driving shaft, and the value of the preset angle $\beta$ is: $60°\leq\beta\leq135°$.

In one embodiment, two or more driving shafts can simultaneously drive the spiral blade and the extrusion device the transmission of the same motor and the transmission component, that is, the driving component drives a plurality of shafts, including two or more shafts, by the same motor, the driving shafts can be realized by the same reduction gearbox or different reduction gearboxes, and the direction can be changed by different gear transmission manners or other transmission manners, such as a helical bevel gear, a turbine and worm, a staggered shaft helical gear and the like, in order to realize preset angle output among the plurality of driving shafts. In addition, the first driving shaft and the second driving shaft can rotate on the same direction, for example, rotating clockwise or rotating counterclockwise, of course, the first driving shaft and the second driving shaft can also rotate oppositely, and for example, one rotates clockwise while the other rotates counterclockwise, the preset angle β is greater than or equal to 60° and smaller than or equal to 135°, and further, the preset angle β is greater than or equal to 70° and smaller than or equal to 120°, and for example, the preset angle β is 90°.

In one embodiment, a rotating speed ratio of the first driving shaft to the second driving shaft is C, and the value of the rotating speed ratio C is: 0.8≤A≤1.5.

In one embodiment, the parameters of the first transmission part and the second transmission part are reasonably selected to control the rotating speed ratio C of the first driving shaft to the second driving shaft, so that the rotating speeds of the first driving shaft and the second driving shaft can adapt to specific application occasions. In one embodiment, for example, when the extrusion device is an extrusion screw, the rotating speed ratio of the first driving shaft to the second driving shaft is within the range of 0.8-1.5, for example, when the rotating speed of the spiral blade is 60 RPM, the rotating speed of the extrusion screw is set to 48-90 RPM, and RPM is a rotating speed unit, that is, revolutions/minute.

In one embodiment, the first transmission part and the second transmission part are bevel gears which are engaged with each other; or the first transmission part is a turbine, and the second transmission part is a worm; or the first transmission part and the second transmission part are two helical gears whose shafts are arranged to be staggered to each other.

In one embodiment, when the output direction of the motor is changed into multi-shaft and multi-angle output by using the transmission component, the first transmission part and the second transmission part can select a plurality of transmission modes, for example, the transmission mode of the bevel gear and the bevel gear, of course, can also be the transmission mode of the turbine and the worm, and of course, can also be the transmission modes of staggered shaft helical gears, etc.

In one embodiment, the transmission component further includes: a shell, and the shell includes an upper shell and a lower shell, which are assembled together, the upper shell and the lower shell are enclosed to form an installation cavity, the first transmission part and the second transmission part are located in the installation cavity, and the first driving shaft and the second driving shaft extend out from the shell.

In one embodiment, the first transmission part, the second transmission part, the first driving shaft and the second driving shaft can be installed in the shell, therefore during specific use, the transmission component can be moved and replaced as an entirety.

In one embodiment, the transmission component further includes a deceleration component arranged between the first transmission part and the motor shaft and used for reducing the rotating speed of the motor shaft to a rotating speed necessary for the first driving shaft and the second driving shaft.

In one embodiment, the food processor further includes: a feeding barrel arranged on the first barrel body, and the feed opening is formed in the feeding barrel.

In one embodiment, a feeding barrel can be arranged for controlling the feeding of the food, and at this time, the feed opening is formed in the feeding barrel.

In one embodiment, of course, no feeding barrel is arranged, and the food is directly placed in the first barrel body at one time, at this time, a lid capable of being opened or closed is arranged on the first barrel body, and the feed opening is the opening of the first barrel body.

In one embodiment, the host component further includes a base and an enclosure, and the enclosure and the base are enclosed to form an accommodation cavity, and the driving component is installed on the base and is located in the accommodation cavity.

In one embodiment, the host component further includes a control device used for controlling the working parameters of the food processor, for example, the rotating speeds of the spiral blade and the extrusion device, and the like, of course, a program device can also be set to realize intelligent program control of the food processor, and for example, a cleaning program device, a plurality of juicing program devices and the like can be set to realize the intelligent juicing and intelligent cleaning of the food processor.

In one embodiment, the host component further includes a power supply device, and the power supply device is used for supplying power for the parts and components of the food processor, for example, the driving component, and the power supply device at least includes a power plug that can be inserted into the electric supply, and thus, during specific use, the power plug can be directly connected with the electric supply so as to supply power for the food processor.

In one embodiment, the food processor includes a juice machine and a juicer.

BRIEF DESCRIPTION OF THE DRAWINGS

Embodiments of the present disclosure will be described by the accompanying drawings.

Figure 1:
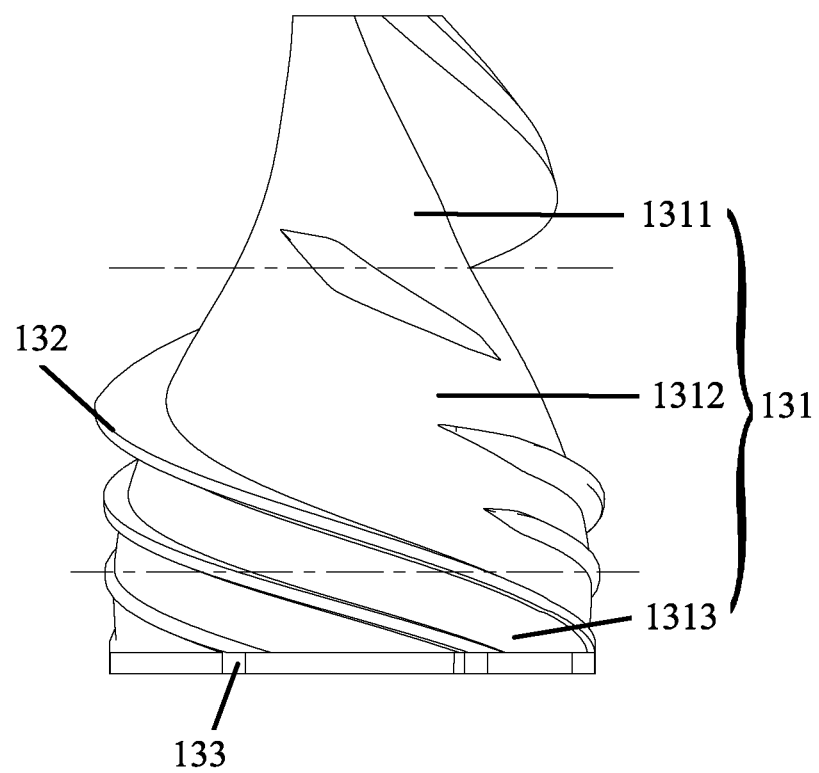
FIG. 1 is a structural schematic diagram of the spiral blade in one embodiment of the present disclosure.

The corresponding relation between reference numerals in FIG. 1 to FIG. 9 and component names is as follows:

11: first barrel body, 12: second barrel body, 121: juice discharge opening, 122: residue discharge opening, 123: barrel seat, 124: barrel lid, 13: spiral blade, 131: spiral blade body, 1311: feeding area, 1312: grinding area, 1313: discharging area, 132: spiral rib, 133: cleaning structure, 14: extrusion device, 15: filter sheet, 16: extrusion sheet, 17: feeding barrel, 18: communication opening, 2: host component, 21: driving component, 211: motor, 212: first transmission part, 213: first driving shaft, 214: second transmission part, 215: second driving shaft, 216: lower shell, 217: upper shell, 218: deceleration component, 22: base, and 23: enclosure.

DETAILED DESCRIPTION OF THE DISCLOSURE

Embodiments of the present disclosure can be understood more clearly, a further detailed description of the present disclosure will be given below in combination with accompanying drawings and embodiments.

In the following description, numerous specific details are set forth in order to provide a thorough understanding of the present disclosure. However, the present disclosure can also be implemented in other manners different from those described herein. Therefore, the protection scope of the present disclosure is not limited to the specific embodiments disclosed below.

A spiral blade, a grinding component and a food processor provided according to some embodiments of the present disclosure are described below with reference to FIG. 1 to FIG. 9.

Figure 2:
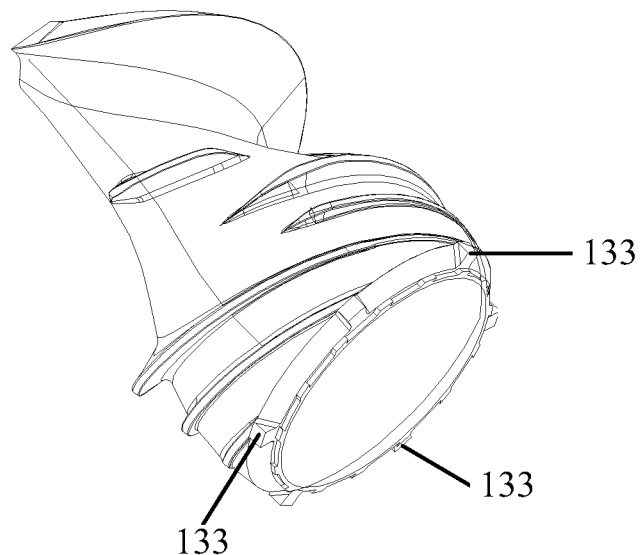
FIG. 2 is another structural schematic diagram of the spiral blade in one embodiment of the present disclosure.
Figure 3:
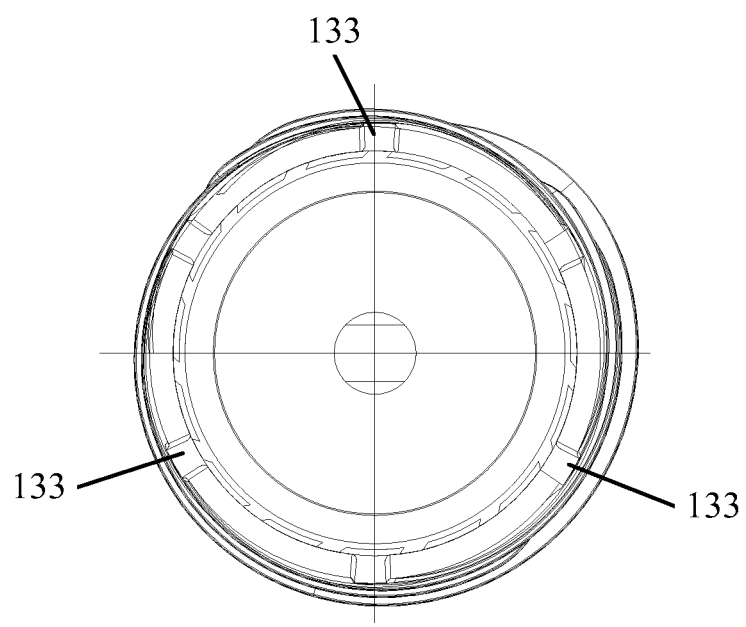
FIG. 3 is yet another structural schematic diagram of the spiral blade in one embodiment of the present disclosure.

As shown in FIG. 1 to FIG. 3, the embodiment of the present disclosure provides a spiral blade 13, including: a spiral blade body 131, and the spiral blade body 131 includes a feeding area 1311 used for feeding, a grinding area 1312 connected with the feeding area 1311 and a discharging area 1313 connected with the grinding area 1312; and a plurality of spiral ribs 132 are arranged on the grinding area 1312, and a cleaning structure 133 is arranged on the discharging area 1313.

According to the spiral blade 13 provided by the embodiment of the present disclosure, the spiral blade 13 includes the feeding area 1311 matched with a feed opening of the food processor, that is, to-be-crushed food arrives at the feeding area 1311 of the spiral blade from the feed opening, then is crushed in the grinding area 1312 of the spiral blade, finally the crushed food is discharged from the discharging area 1313, meanwhile the spiral blade 13 is applied to the food processor and is only used for grinding the food rather than extruding juice and discharging residues, therefore its structure is relatively simple, meanwhile as the cleaning structure 133 is arranged on the discharging area 1313, the cleaning structure 133 can be used for pushing the crushed food to a predetermined area, so that the crushed food can be pushed away from the predetermined area more easily, and thus the discharge efficiency of the spiral blade 13 can be improved.

A dotted line in FIG. 1 is the boundary of the feeding area 1311 and the grinding area 1312 or the grinding area 1312 and the discharging area 1313 of the spiral blade 13.

In one embodiment, as shown in FIG. 1 to FIG. 3, the area of the cross section of the spiral blade body 131 gradually increases from the feeding area 1311 to the grinding area 1312.

In one embodiment, the area of the cross section of the spiral blade body 131 gradually increases from the feeding area 1311 to the grinding area 1312, that is to say, the spiral blade body 131 is approximately conical, and the taper of the cone is within the range of 3° to 15° and is further 5°, due to this setting, when the spiral blade 13 is applied to the food processor to crush the food, the spiral blade can crush the food smaller and smaller, and thus the food grinding effect of the food processor can be improved to improve the juice yield.

In one embodiment, as shown in FIG. 1 to FIG. 3, a plurality of cleaning structures 133 are arranged, this setting can push the food crushed by the spiral blade 13 to the predetermined area by the plurality of cleaning structures 133, and thus the crushed food can be discharged from the predetermined area.

In one embodiment, the plurality of cleaning structures 133 are symmetrically arranged on the discharging area 1313, as the plurality of cleaning structures 133 are symmetrically arranged, the crushed food on the surrounding of the spiral blade 13 can be pushed to the predetermined area so as to prevent a discharging dead corner.

In one embodiment, the cleaning structure 133 is a cleaning rib and/or the cleaning structure 133 is a slope structure protruding from the spiral blade body.

In one embodiment, the cleaning structure can be a cleaning rib, can also be the slope structure protruding from the spiral blade body, and of course, it can also be other structures that can push the food in the discharging area to the predetermined area.

In one embodiment, as shown in FIG. 1 and FIG. 2, the spiral rib 132 extends from a connection site of the grinding area 1312 and the discharging area 1313 toward the grinding area 1312, and one end of the spiral rib 132 away from the discharging area 1313 is in the shape of a sharp spout.

In one embodiment, as shown in FIG. 1 and FIG. 2, as one end of the spiral rib 132 away from the discharging area 1313 is in the shape of the sharp spout, the food can be better crushed, and thus the juice yield can be improved.

In one embodiment, the spiral blade 13 is made of food-grade wear resistant plastic, of course, can also be made of a metal material, such as stainless steel, copper and the like, and can also be made of ceramic, C segment embedded stainless steel, copper and the like, and, the spiral blade 13 is formed by integrated injection molding.

In one embodiment, the height ratio of the feeding area 1311 to the grinding area 1312 is A, the value of the height ratio A is: $0.5 \leq A \leq 0.75$, the height ratio of the grinding area 1312 to the discharging area 1313 is B, and the value of the height ratio B is: $1/30 \leq B \leq 1/15$.

In one embodiment, the height ratios of the feeding area 1311 to the grinding area 1312 and the discharging area 1313 are reasonably set, so that the feeding, grinding and discharging processes of the spiral blade can be reasonably matched with one another, that is, the food can be reasonably and uniformly distributed on three segments of the spiral blade, accordingly, the food can be prevented from pushing and extruding the feeding area 1311, and the food residues can also be prevented from being blocked in the discharging area 1313, as a result, the feeding, grinding and discharging processes can be implemented smoothly, then food blockage and other faults when the spiral blade crushes the food can be avoided, and thus the user experience can be improved.

Figure 4:
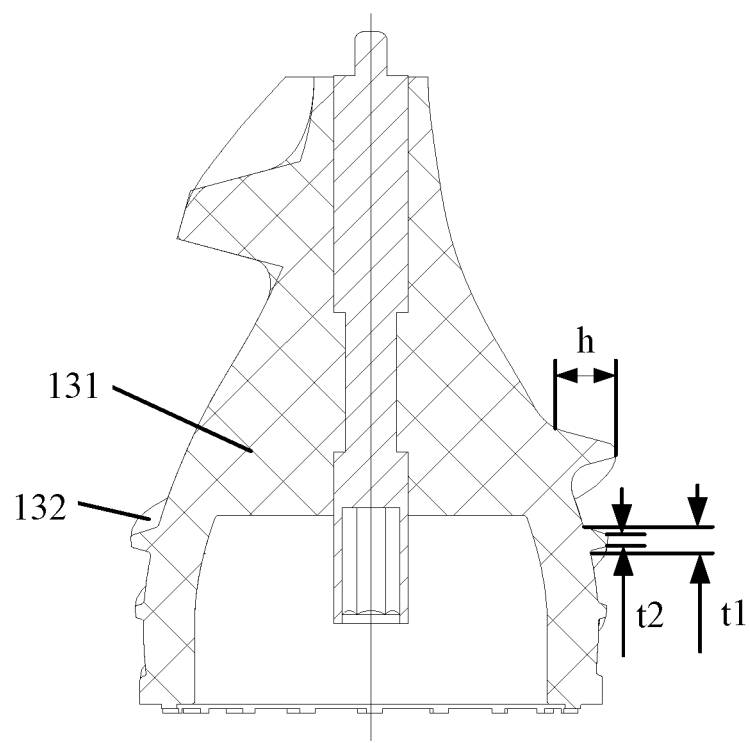
FIG. 4 is yet another structural schematic diagram of the spiral blade in one embodiment of the present disclosure.

In one embodiment, as shown in FIG. 4, the projection height of the spiral rib 132 on the radial direction of the spiral blade body 131 is h, and the value of the projection height h is: $0.5 \text{ mm} \leq h \leq 29.99 \text{ mm}$.

In one embodiment, as the projection height of the spiral rib 132 on the radial direction of the spiral blade body 131 is set to be within the range of being greater than or equal to 0.5 mm and being smaller than or equal to 29.99 mm, on the one hand, the spiral rib 132 has a certain height, therefore the spiral rib and the spiral blade body 131 can be enclosed to form a passage with a certain volume, the crushed food enters the passage from the feeding area 1311 and gradually moves toward the discharging area 1313 along the passage, then grinding and discharging can be accomplished, meanwhile, as the projection height of the spiral rib 132 on the radial direction of the spiral blade body 131 is set to be within the range of being greater than or equal to 0.5 mm and being smaller than or equal to 29.99 mm, the height of the spiral rib 132 is not too large, accordingly the overall strength of the spiral rib 132 can be guaranteed, therefore the grinding degree of the spiral blade on the food can be properly improved to improve the grinding effect of the food, meanwhile, after the strength of the spiral rib 132 is improved, the overall strength of the spiral blade can also be improved, and the service life of the spiral blade is prolonged.

In one embodiment, as shown in FIG. 4, the width of one end of the spiral rib 132 connected with the spiral blade body 131 is t1, and the value of the width t1 is 5 mm≤t1≤21.99 mm.

In one embodiment, as the width of one end (i.e., the root of the spiral rib 132) of the spiral rib 132 connected with the spiral blade body 131 is set to be within the range of being greater than or equal to 5 mm and being smaller than or equal to 21.99 mm, the spiral rib 132 and the spiral blade body 131 have a certain connecting width, therefore the connecting strength between the spiral rib 132 and the spiral blade body 131 can be improved, as a result, the situation that the spiral rib 132 of the spiral blade 13 breaks in a juice extrusion and residue discharge process can be prevented, then the overall strength of the spiral blade 13 can be improved, and the service life of the spiral blade 13 is prolonged.

In one embodiment, as shown in FIG. 4, the width of one end of the spiral rib 132 away from the spiral blade body 131 is t2, and the value of the width t2 is 1 mm≤t2≤4.99 mm.

In one embodiment, as the width of one end (i.e., the end part of the spiral rib 132) of the spiral rib 132 away from the spiral blade body 131 is set to be within the range of being greater than or equal to 1 mm and being smaller than or equal to 4.99 mm, the width of the end part of the spiral rib 132 is smaller, therefore the crushed food can be guided to move from a feeding segment toward an extrusion segment and a residue discharge segment in sequence along the spiral blade 13, and thus the juice extrusion and residue discharge efficiency of the spiral blade 13 can be improved.

Figure 6:
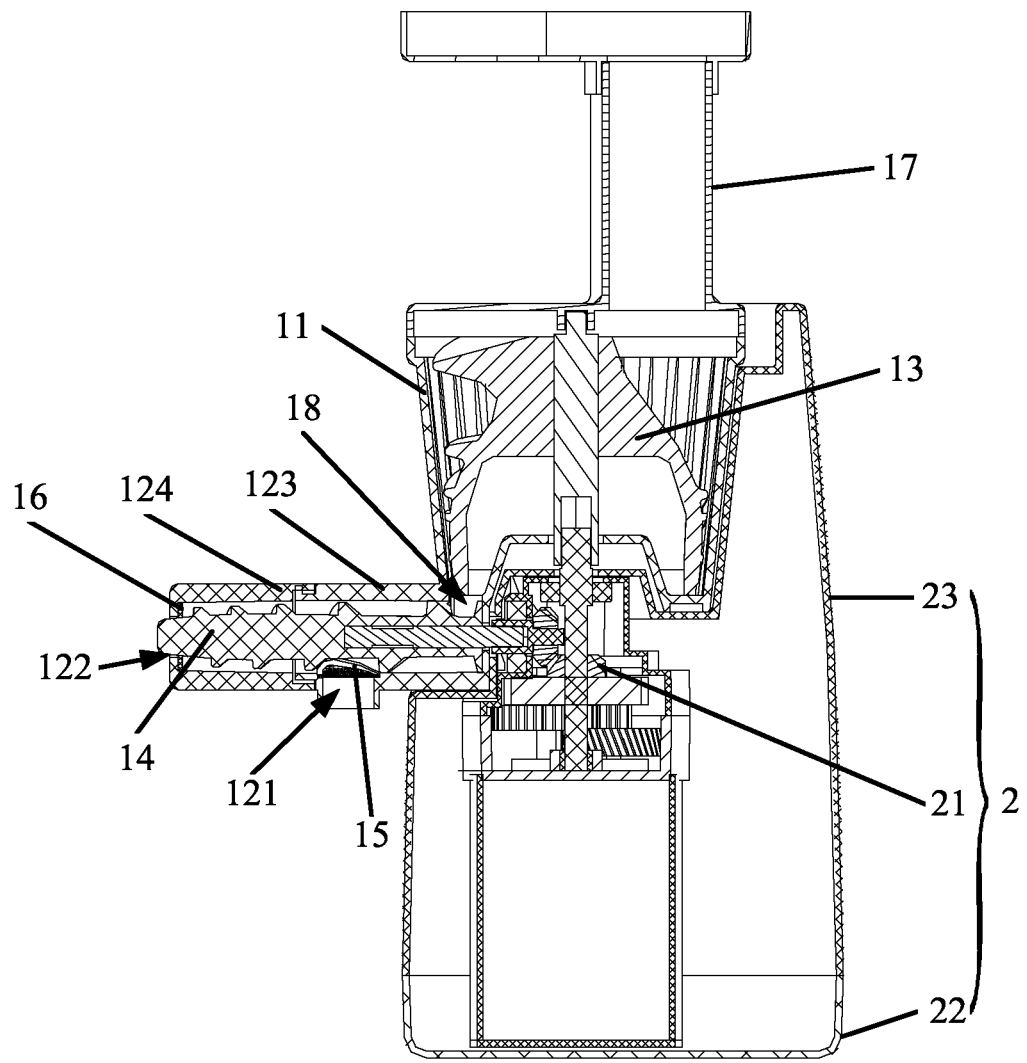
FIG. 6 is a structural schematic diagram of the food processor in one embodiment of the present disclosure.
Figure 7:
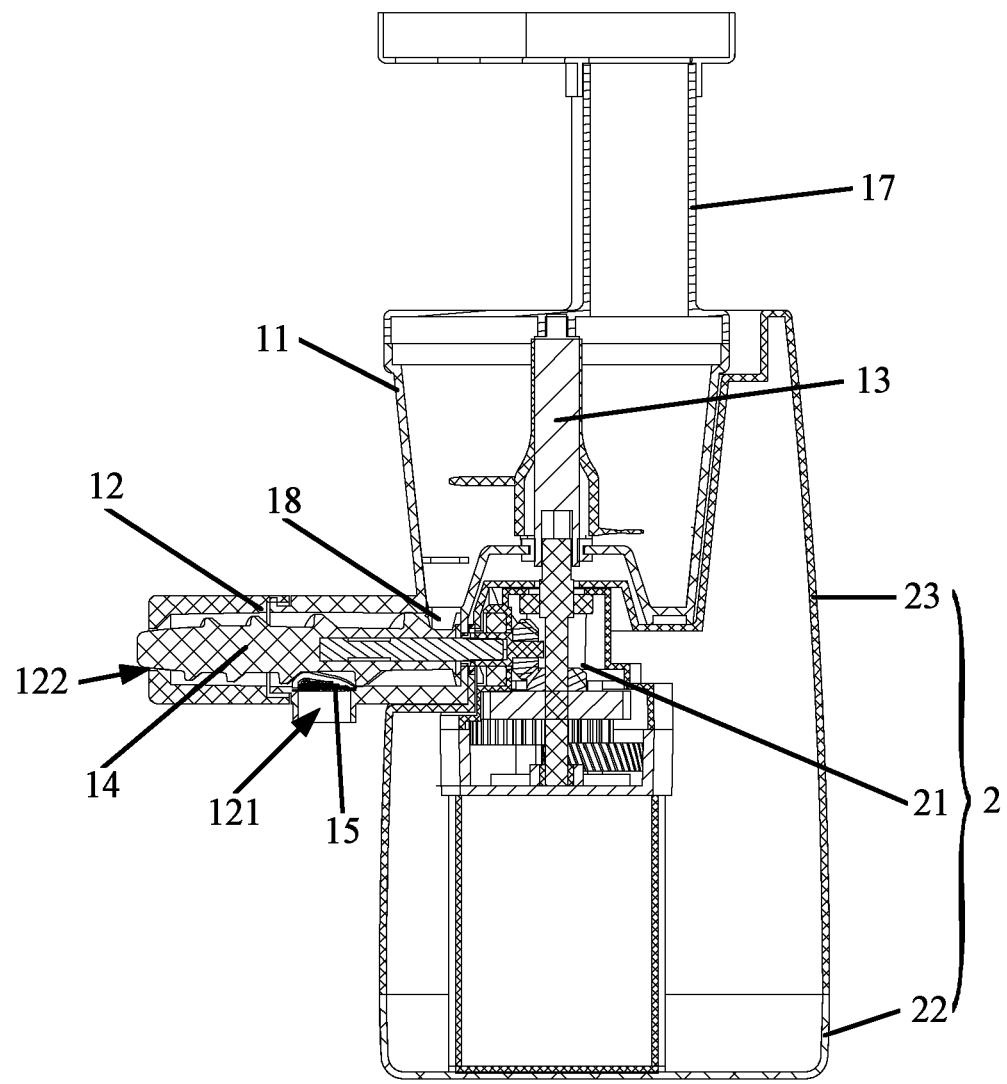
FIG. 7 is another structural schematic diagram of the food processor in one embodiment of the present disclosure.
Figure 8:
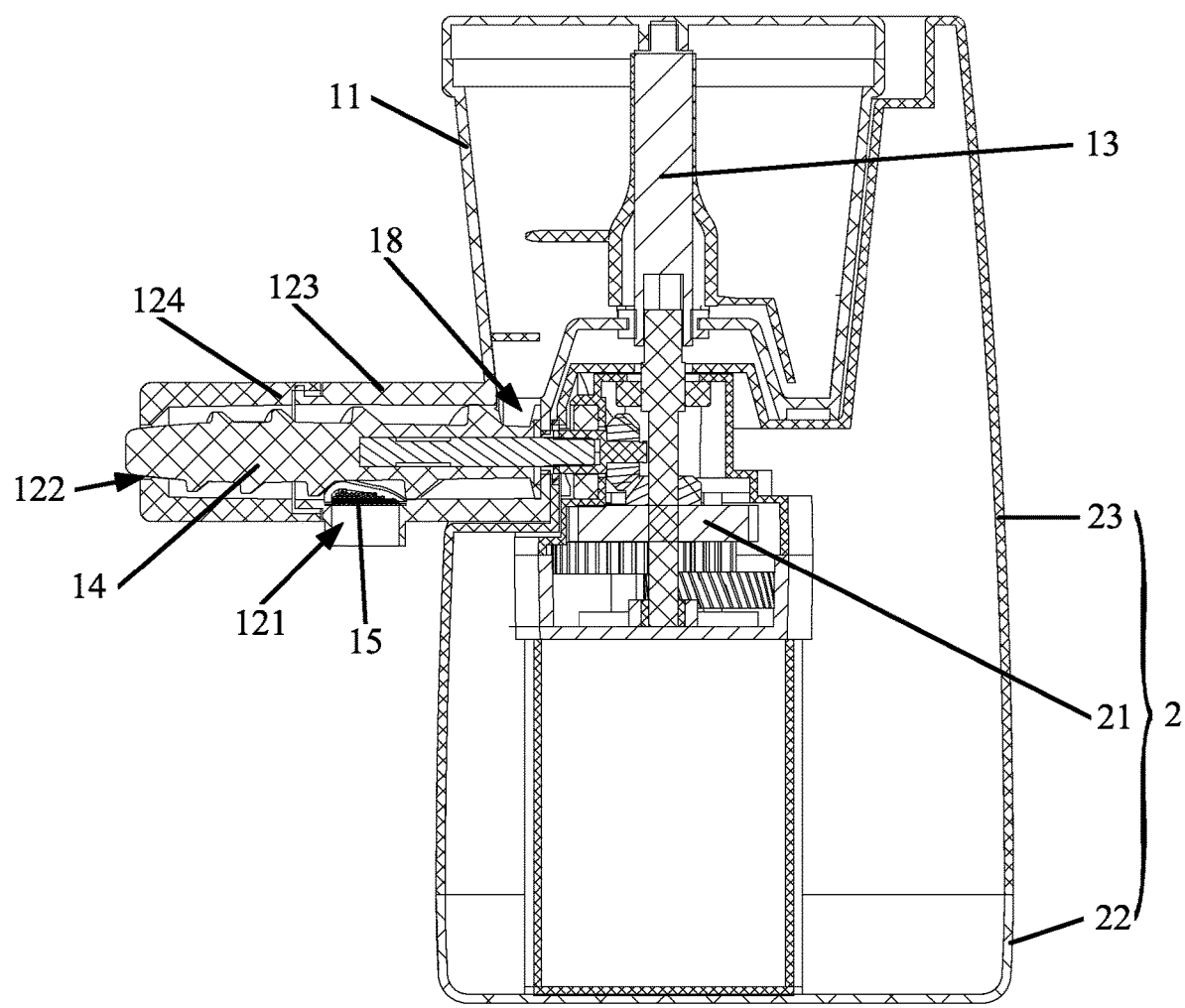
FIG. 8 is yet another structural schematic diagram of the food processor in one embodiment of the present disclosure.

In one embodiment, as shown in FIG. 6 to FIG. 8, the spiral blade 13 further includes: a mounting shaft, and the spiral blade body 131 is installed on the mounting shaft, and the mounting shaft is used for mounting the spiral blade body 131.

In one embodiment, when the spiral blade 13 is installed, the mounting shaft can be in driving connection with a motor and other driving devices so as to realize driving installation of the spiral blade.

Figure 5:
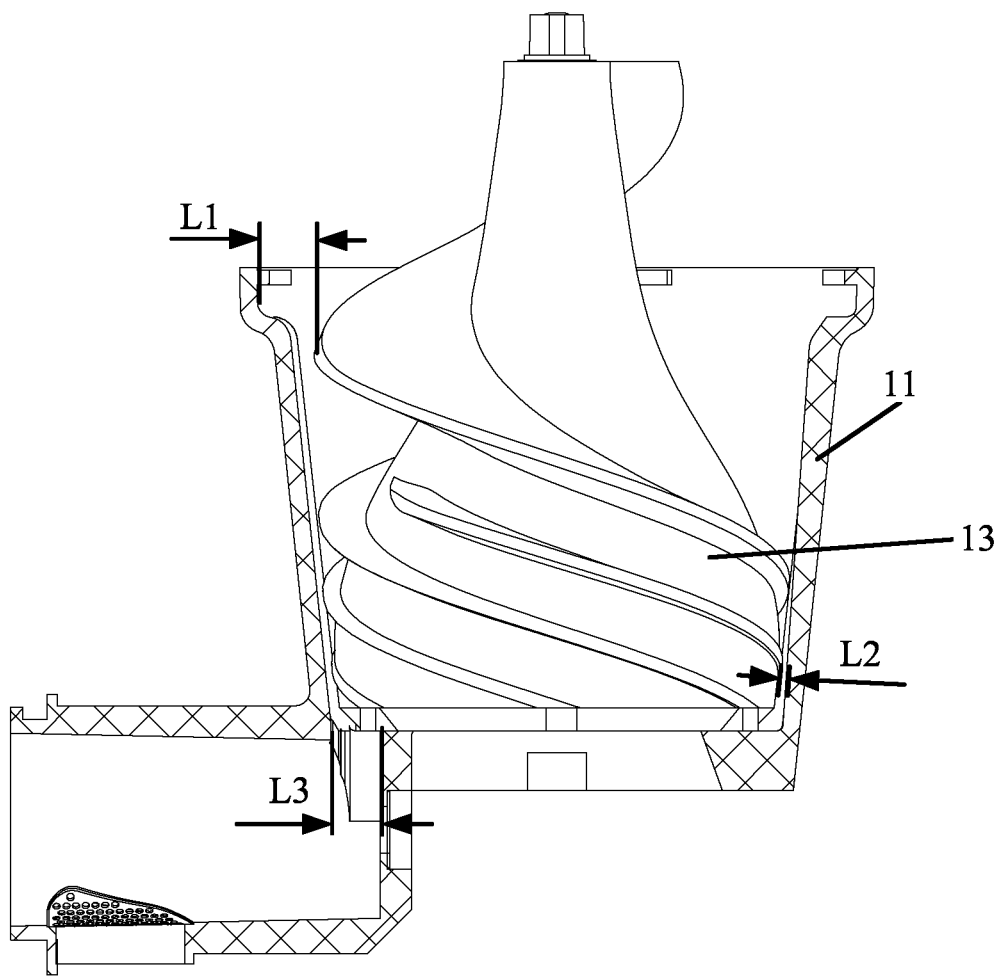
FIG. 5 is a structural schematic diagram of the grinding component in one embodiment of the present disclosure.

As shown in FIG. 5, the embodiment of the present disclosure provides a grinding component for a food processor, the grinding component includes a first barrel body 11; and the spiral blade 13 provided by any embodiment, and the spiral blade 13 is rotationally installed in the first barrel body 11, and the spiral blade 13 is matched with the first barrel body 11 to crush the food.

The grinding component according to the embodiment of the present disclosure can be applied to the food processor including an extrusion component, therefore the food can be crushed by using the grinding component, the crushed food enters the extrusion component, the extrusion component accomplishes a juice extrusion and residue discharge process, that is, the grinding process and the juice extrusion and residue discharge process of the food are separately performed, the grinding component mainly crushes the food by using the spiral blade 13 provided by any embodiment of the present disclosure, and thus the grinding component provided by the embodiment of the present disclosure has all the beneficial effects of the spiral blade 13 provided by any one of the above-mentioned embodiments.

In one embodiment, as shown in FIG. 5, a first gap is arranged between the spiral blade 13 and an inner side wall of the first barrel body 11; and the first gap gradually decreases from the feeding area 1311 to the discharging area 1313.

In one embodiment, when the spiral blade 13 is matched with the inner side wall of the first barrel body 11 to crush the food, the spiral blade 13 and the inner side wall of the first barrel body 11 form a grinding passage, the first gap gradually decreases from the feeding area 1311 to the discharging area 1313, that is to say, the grinding passage formed by the spiral blade 13 and the inner side wall of the first barrel body 11 becomes narrower and narrower, then when the food is crushed by using the grinding passage, the food can be crushed smaller and smaller, for example, when the food just enters the first barrel body 11, the granules of the food are greater, the distance between the inner side wall of the first barrel body 11 and the grinding device adapts to the granules of the food, the food is gradually crushed to smaller granules and gradually moves toward the bottom of the first barrel body 11 under the action of the grinding device and the first barrel body 11, so the first gap close to the bottom of the first barrel body 11 is set to be smaller, in this case, the first gap can adapt to the sizes of the granules of the food herein on the one hand, the food herein can be further crushed to smaller granules under the coaction of the grinding device and the first barrel body 11 on the other hand, accordingly gradual and sufficient grinding of the food can be realized, and then the juice yield of the food can be improved.

In one embodiment, the first gap is within the range of 0.3 mm to 18.99 mm, further, as shown in FIG. 5, the gap L1 between the feeding area 1311 and the inner side wall of the first barrel body 11 is 3-18.99 mm, and the gap L2 between the residue discharge area and the inner side wall of the first barrel body 11 is 0.3-2.99 mm.

In one embodiment, as shown in FIG. 5, the barrel opening of the first barrel body 11 gradually decreases from one end close to the feeding area 1311 to the other end close to the discharging area 1313.

In one embodiment, the barrel opening of the first barrel body 11 gradually decreases from one end close to the feeding area 1311 to the other end close to the discharging area 1313, that is, the inner cavity of the first barrel body 11 is in the shape of an inverted cone having a large upper part and a small lower part, so the first gap between the first barrel body and the spiral blade 13 can gradually decrease from top to bottom, then the food can be crushed smaller and smaller, and thus the juice yield of the food can be improved.

The embodiment of the present disclosure provides a food processor, as shown in FIG. 6 to FIG. 9, including: a feed opening; the grinding component in any embodiment, and the first barrel body 11 of the grinding component is communicated with the feed opening; an extrusion component, and the extrusion component includes a second barrel body 12 and an extrusion device 14 rotationally installed in the second barrel body 12, the second barrel body 12 is communicated with the first barrel body 11 through a communication opening 18, and the extrusion device 14 is matched with the inner side wall of the second barrel body 12 for extruding juice and discharging residues; and a host component 2, and the grinding component and the extrusion component are installed on the host component 2, the host component 2 includes a driving component 21, and the driving component 21 is used for driving the spiral blade 13 of the grinding component to crush the food and is used for driving the extrusion device 14 to extrude juice and discharge residues.

According to the food processor provided by the embodiment of the present disclosure, after the food enters the first barrel body 11 from the feed opening, the food is crushed by the match of the spiral blade 13 and the side wall of the first barrel body 11, and the crushed food enters the second barrel body 12 from the communication opening under the action of the spiral blade 13 and is extruded by the extrusion device 14 to separate the juice of the food from the residues. In one embodiment, the grinding process and the juice extrusion and residue discharge process of the food are separately performed, no juice extrusion or residue discharge is required in the grinding process, therefore no filter screen or a rotary brush and other components need to be arranged in the first barrel body 11, so that the food in the first barrel body 11 can be crushed under the coaction of the first barrel body 11 and the spiral blade 13, meanwhile, the extrusion device 14 can be approximately horizontally arranged in the juice extrusion and residue discharge process, that is, a juice extrusion and residue discharge system can be set to be horizontal, accordingly the juice and residues of the food can be conveniently separated, this setting can ensure the juice yield of the food processor on the one hand, and can avoid the use of the filter screen, the rotary brush and other parts and components on the other hand, in this case, the food processor is simple in structure and is easy to install, meanwhile as the filter screen is cancelled, the cleaning difficulty of the user can be reduced, and then the user experience can be improved.

As shown in FIG. 6 to FIG. 8, the grinding component and the extrusion component constitute a barrel body component installed on the host component 2.

In one embodiment, the projection width L3 of the communication opening on the axial direction of the extrusion device is within the range of 2 mm to 19 mm.

In one embodiment, as shown in FIG. 6 to FIG. 8, a juice discharge opening 121 and a residue discharge opening 122 are formed in the second barrel body 12; and a filter sheet 15 is arranged at the juice discharge opening 121.

In one embodiment, after the crushed food enters the second barrel body 12, the juice is separated from the residues under the extrusion of the extrusion device 14, the separated food juice is discharged from the juice discharge opening 121 on the second barrel body 12, and the separated food residues are discharged from the residue discharge opening 122 on the second barrel body 12. The filter sheet 15 is arranged to prevent the food residues from being discharged from the juice discharge opening 121, meanwhile the distance between the filter sheet 15 and the extrusion device 14 can also be reasonably set according to the sizes of the granules of the food residues, so that the automatic cleaning of the filter sheet 15 can be realized by the friction between the extrusion device 14 and the filter sheet 15, and the extrusion device 14 is in contact with the filter sheet 15, or the gap between the extrusion device 14 and the filter sheet 15 is smaller than the sizes of the granules of the food.

, the filter sheet 15 is a metal filter sheet, as the hardness and the wear resistance of the metal filter sheet are relatively good, so when the filter sheet 15 is cleaned by the extrusion device 14, the situation that the filter sheet is damaged due to insufficient strength can be prevented.

In one embodiment, an extrusion sheet 16 is arranged at the residue discharge opening 122.

In one embodiment, the extrusion sheet 16 is arranged at the residue discharge opening 122 to further extrude the food, so that the juice-residue separation of the food is more thorough, then more food juice can be extruded, and thus the juice yield of the food processor can be improved, the extrusion sheet 16 is an extrusion rubber sheet, and as the extrusion rubber sheet has a certain elasticity, the food residues can be further extruded.

In one embodiment, as shown in FIG. 6 to FIG. 9, the extrusion device 14 is an extrusion screw.

In one embodiment, the second barrel body 12 includes: a hollow barrel seat 123 with one open end, and the other end of the barrel seat 123 is communicated with the first barrel body 11 through the communication opening; and a barrel lid 124 covered on the open end of the barrel seat 123, and the residue discharge opening is formed in the barrel lid 124.

In one embodiment, the barrel seat 123 can be installed on the first barrel body 11 at first, then the extrusion device is installed on the driving component in a driving manner, and the barrel lid 124 is covered on the barrel seat 123 to accomplish the installation of the second barrel body 12.

, the barrel seat 123 and the first barrel body 11 are of an integral structure, this setting can enhance the connecting strength between the first barrel body 11 and the barrel seat 123 on the one hand, and can guarantee the sealing property between the first barrel body 11 and the barrel seat 123 on the other hand, so that juice leakage can be prevented.

In one embodiment, the first barrel body 11 and/or the second barrel body 12 are/is made of a transparent material or a stainless steel material.

In one embodiment, since the first barrel body 11 and the second barrel body 12 are made of the transparent material, the user can clearly see the food in the first barrel body 11 and the second barrel body 12, as a result, the user can master the condition of the food in the first barrel body 11 and the second barrel body 12, and thus the user experience can be improved. If the first barrel body 11 and the second barrel body 12 are made of the stainless steel material, the strength of the first barrel body 11 and the second barrel body 12 can be ensured on the one hand, and the rusting and other conditions of the first barrel body 11 and the second barrel body 12 can be prevented on the other hand, therefore the durability of the first barrel body 11 and the second barrel body 12 can be improved.

Figure 9:
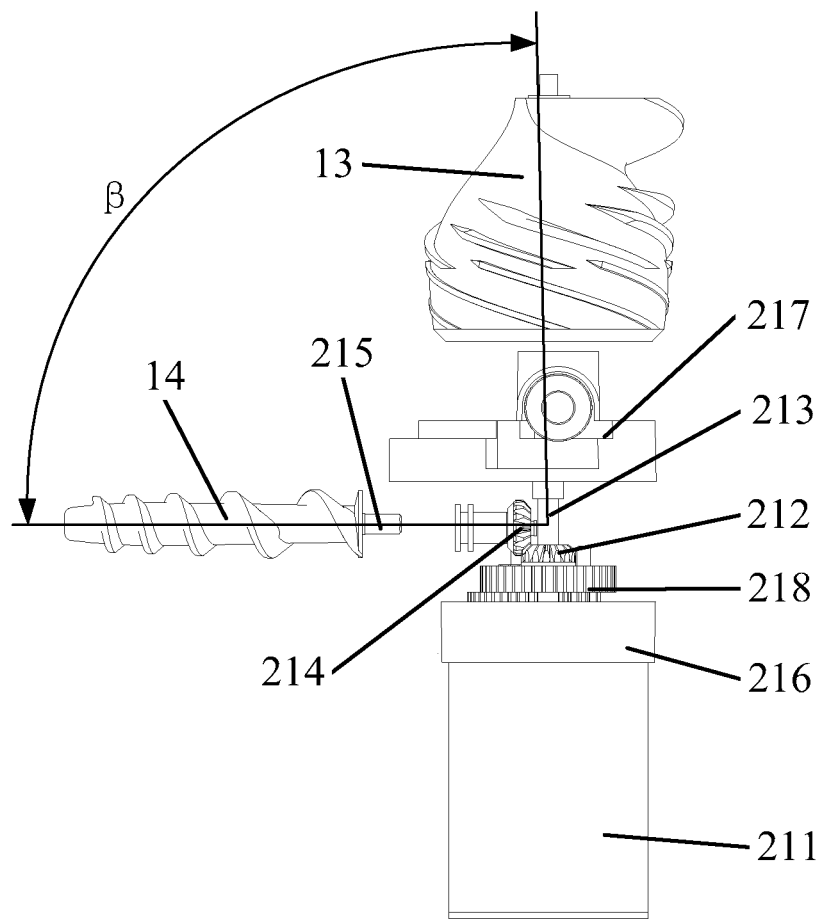
FIG. 9 is a structural schematic diagram of a driving component of the food processor in one embodiment of the present disclosure.

In one embodiment, as shown in FIG. 9, the driving component 21 includes a motor 211, and a motor shaft is arranged on the motor 211; a transmission component, and the transmission component at least includes: a first transmission part 212, and the first transmission part 212 is in driving connection with the motor shaft, a first driving shaft 213 is arranged on the first transmission part 212, and the first driving shaft is connected with the spiral blade 13 and is used for driving the spiral blade 13 to crush the food; and a second transmission part 214, and the second transmission part 214 is in driving connection with the motor shaft, a second driving shaft 215 is arranged on the second transmission part 214, and the second driving shaft 215 is connected with the extrusion device 14 and is used for driving the extrusion device 14 to extrude juice and discharge residues; and the first driving shaft is vertically arranged, the first driving shaft form a preset angle β with the second driving shaft 215, and the value of the preset angle β is: $60°≤β≤135°$.

In one embodiment, two or more driving shafts can simultaneously drive the spiral blade 13 and the extrusion device 14 by the transmission of the same motor 211 and the transmission component, that is, the driving component 21 drives a plurality of shafts, including two or more shafts, by the same motor 211, the driving shafts can be realized by the same reduction gearbox or different reduction gearboxes, and the direction can be changed by different gear transmission manners or other transmission manners, such as a helical bevel gear, a turbine and worm, a staggered shaft helical gear and the like, in order to realize preset angle output among the plurality of driving shafts. In addition, the first driving shaft and the second driving shaft 215 can rotate on the same direction, for example, rotating clockwise or rotating counterclockwise, of course, the first driving shaft and the second driving shaft 215 can also rotate oppositely, and for example, one rotates clockwise while the other rotates counterclockwise, the preset angle β is greater than or equal to 65° and smaller than or equal to 135°, and further the preset angle β is greater than or equal to 70° and smaller than or equal to 120°, and for example, the preset angle β is 90°.

In one embodiment, a rotating speed ratio of the first driving shaft to the second driving shaft 215 is C, and the value of the rotating speed ratio C is: 0.8≤C≤1.5.

In one embodiment, the parameters of the first transmission part 212 and the second transmission part 214 are reasonably selected to control the rotating speed ratio C of the first driving shaft to the second driving shaft 215, so that the rotating speeds of the first driving shaft and the second driving shaft 215 can adapt to specific application occasions. In one embodiment, for example, when the extrusion device 14 is an extrusion screw, the rotating speed ratio of the first driving shaft to the second driving shaft 215 is within the range of 0.8-1.5, for example, when the rotating speed of the spiral blade 13 is 60 RPM, the rotating speed of the extrusion screw is set to 48-90 RPM, and RPM is a rotating speed unit, that is, revolutions/minute.

In one embodiment, the first transmission part 212 and the second transmission part 214 are bevel gears which are engaged with each other; or the first transmission part 212 is a turbine, and the second transmission part 214 is a worm; or the first transmission part 212 and the second transmission part 214 are two helical gears whose shafts are arranged to be staggered to each other.

In one embodiment, when the output direction of the motor 211 is changed into multi-shaft and multi-angle output by using the transmission component, the first transmission part 212 and the second transmission part 214 can select a plurality of transmission modes, for example, the transmission mode of the bevel gear and the bevel gear, of course, can also be the transmission mode of the turbine and the worm, and of course, can also be the transmission modes of staggered shaft helical gears, etc.

In one embodiment, as shown in FIG. 9, the transmission component further includes: a shell, and the shell includes an upper shell 217 and a lower shell 216, which are assembled together, the upper shell 217 and the lower shell 216 are enclosed to form an installation cavity, the first transmission part 212 and the second transmission part 214 are located in the installation cavity, and the first driving shaft and the second driving shaft 215 extend out from the shell.

In one embodiment, the first transmission part 212, the second transmission part 214, the first driving shaft and the second driving shaft 215 can be installed in the shell, therefore during specific use, the transmission component can be moved and replaced as an entirety.

In one embodiment, as shown in FIG. 9, the transmission component further includes a deceleration component 218 arranged between the first transmission part 212 and the motor shaft and used for reducing the rotating speed of the motor shaft to a rotating speed necessary for the first driving shaft and the second driving shaft 215.

In one embodiment, as shown in FIG. 6 and FIG. 7, the food processor further includes: a feeding barrel 17, and the feeding barrel 17 is arranged on the first barrel body 11, and the feed opening is formed in the feeding barrel 17.

In one embodiment, a feeding barrel 17 can be arranged for controlling the feeding of the food, and at this time, the feed opening is formed in the feeding barrel 17.

In one embodiment, as shown in FIG. 8, of course, no feeding barrel 17 is arranged, and the food is directly placed in the first barrel body 11 at one time, at this time, a lid capable of being opened or closed is arranged on the first barrel body 11, and the feed opening is the opening of the first barrel body 11.

In one embodiment, as shown in FIG. 6 to FIG. 8, the host component 2 further includes a base 22 and an enclosure 23, and the enclosure 23 and the base 22 are enclosed to form an accommodation cavity, and the driving component 21 is installed on the base 22 and is located in the accommodation cavity.

In one embodiment, the host component 2 further includes a control device used for controlling the working parameters of the food processor, for example, the rotating speeds of the spiral blade 13 and the extrusion device 14, and the like, of course, a program device can also be set to realize intelligent program control of the food processor, and for example, a cleaning program device, a plurality of juicing program devices and the like can be set to realize the intelligent juicing and intelligent cleaning of the food processor.

In one embodiment, the host component 2 further includes a power supply device, and the power supply device is used for supplying power for the parts and components of the food processor, for example, the driving component 21, and the power supply device at least includes a power plug that can be inserted into the electric supply, and thus, during specific use, the power plug can be directly connected with the electric supply so as to supply power for the food processor.

In one embodiment, the food processor includes a juice machine and a juicer.

In the description of the present specification, the terms "first" and "second" are used for descriptive purposes only and may not be construed as indicating or implying relative importance, unless expressly stated and limited otherwise; the terms "connection", "installation", "fixation" and the like should be broadly defined unless otherwise specified or indicated, for example, the "connection" may be a fixed connection, may also be a detachable connection, or an integral connection; and it may be directly connected and may also be indirectly connected through an intermediate medium. disclosure In the description of the present specification, the description of the terms "one embodiment," "some embodiments," "specific embodiments" and the like means that a particular feature, structure, material or characteristic described in combination with the embodiment or example is included in at least one embodiment or example of the present disclosure. In the present specification, the schematic representation of the above terms does not necessarily refer to the same embodiment or example. Furthermore, the particular features, structures, materials or characteristics described may be combined in any suitable manner in any one or more embodiments or examples.

What is claimed is:

1. A food processor, comprising:
a feed opening;
a grinding component, comprising:
a first barrel body in connection with the feed opening; and
a spiral blade comprising a spiral blade body, wherein the spiral blade body comprises a feeding area configured for feeding food, a grinding area connected with the feeding area, and a discharging area connected with the grinding area;
wherein a plurality of spiral ribs are arranged on the grinding area, and a plurality of cleaning ribs protruding from the spiral blade body are arranged at position of the discharging area;
wherein the spiral blade is rotationally installed in the first barrel body and configured to crush the food together with the first barrel body;
an extrusion component comprising a second barrel body and an extrusion device rotationally installed in the second barrel body, wherein the second barrel body communicates with the first barrel body through a communication opening towards downwards; and
a host component comprising a driving component, wherein the driving component is configured for driving the spiral blade and the extrusion device;
wherein the first barrel body is upright in relative to the second barrel body, and the second barrel body is horizontal in relative to the first barrel body;
wherein each of the plurality of spiral ribs has an upper surface and a lower surface, and the communication opening is under the lower surfaces of the plurality of spiral ribs.

2. The food processor of claim 1, wherein,
the second barrel body comprises a juice discharge opening and a residue discharge opening; and
a filter sheet is arranged at the juice discharge opening.

3. The food processor of claim 2, wherein,
a pressing sheet is arranged at the residue discharge opening.

4. The food processor of claim 2, wherein the second barrel body comprises:
a hollow barrel seat with one open end, wherein the other end of the barrel seat is communicated with the first barrel body through the communication opening; and
a barrel lid covered on the open end of the barrel seat, wherein the residue discharge opening is formed in the barrel lid.

5. The food processor of claim 4, wherein the first barrel body and the barrel seat are of an integral structure.

6. The food processor of claim 1, wherein the driving component comprises:
a motor on which a motor shaft is arranged;
a transmission component which at least comprises:
a first transmission part which is in driving connection with the motor shaft, wherein a first driving shaft is arranged on the first transmission part, and the first driving shaft is connected with the spiral blade and is used for driving the spiral blade to crush the food; and
a second transmission part which is in driving connection with the motor shaft, wherein a second driving shaft is arranged on the second transmission part, and the second driving shaft is connected with the extrusion device and is used for driving the extrusion device to extrude juice and discharge residues;
wherein the first driving shaft is vertically arranged, the first driving shaft forms a preset angle $\beta$ with the second driving shaft, and the value of the preset angle $\beta$ is more than or equal to 60° and less than or equal to 135°.

7. The food processor of claim 1, further comprising:
a feeding barrel arranged on the first barrel body, wherein the feed opening is formed in the feeding barrel.

8. The food processor of claim 1, wherein direction of the communication opening is vertical, and rotation axis of the spiral blade is vertical.

9. The food processor of claim 1, wherein angle between the axis of the spiral blade and axis of the extrusion device is between 60° to 135°.

10. The food processor of claim 1, wherein the first barrel body is upright in relative to a bottom surface of a base of the food processor, and the second barrel body is horizontal in relative to the bottom surface of the base.

11. The food processor of claim 1, wherein the communication opening corresponds to the extrusion device.

12. The food processor of claim 1, wherein a second spiral blade is provided on outer surface of the extrusion device and away from the communication opening.

* * * * *